United States Patent
Guu et al.

(10) Patent No.: US 7,114,051 B2
(45) Date of Patent: Sep. 26, 2006

(54) METHOD FOR PARTITIONING MEMORY MASS STORAGE DEVICE

(75) Inventors: Morris Guu, Taipei (TW); Yin Guei Chen, Taipei (TW)

(73) Assignee: Solid State System Co., Ltd., Hsinchu (TW)

( * ) Notice: Subject to any disclaimer, the term of this patent is extended or adjusted under 35 U.S.C. 154(b) by 353 days.

(21) Appl. No.: 10/160,519

(22) Filed: Jun. 1, 2002

(65) Prior Publication Data

US 2003/0225960 A1 Dec. 4, 2003

(51) Int. Cl.
*G06F 12/06* (2006.01)

(52) U.S. Cl. .................. 711/173; 711/202; 711/111

(58) Field of Classification Search ............... 711/170, 711/171, 173, 202, 206, 207, 111, 112, 114
See application file for complete search history.

(56) References Cited

U.S. PATENT DOCUMENTS

| | | | | |
|---|---|---|---|---|
| 5,974,517 A * | 10/1999 | Gaudet | ....................... | 711/173 |
| 6,400,823 B1 * | 6/2002 | Angelo | ....................... | 380/255 |
| 6,532,535 B1 * | 3/2003 | Maffezzoni et al. | ........... | 713/1 |
| 6,601,152 B1 * | 7/2003 | Uchida | ........................ | 711/164 |
| 6,633,962 B1 * | 10/2003 | Burton et al. | ................ | 711/163 |
| 6,636,958 B1 * | 10/2003 | Abboud et al. | ............. | 711/173 |
| 6,647,481 B1 * | 11/2003 | Luu et al. | .................... | 711/206 |
| 6,763,458 B1 * | 7/2004 | Watanabe et al. | ........... | 713/100 |
| 6,973,517 B1 * | 12/2005 | Golden et al. | ............... | 710/104 |
| 2002/0157027 A1 * | 10/2002 | Dayan et al. | ................ | 713/202 |

FOREIGN PATENT DOCUMENTS

EP 000417889 * 3/1991
WO WO 2004055702 A1 * 7/2004

OTHER PUBLICATIONS

"Linux for Handheld computers" (Linux CE; downloaded Feb. 23, 2000 from http://www.linuxce.org; 2 pp.).*

* cited by examiner

*Primary Examiner*—Pierre-Michel Bataille
(74) *Attorney, Agent, or Firm*—J.C. Patents

(57) ABSTRACT

A method for partitioning a memory mass storage device is disclosed. The partition task is performed by the controller within the memory mass storage device. Firstly, the controller partitions the logical space of the memory storage device into multiple areas, each area belonging to a particular drive. Secondly, the controller partitions the logical space of the memory storage device into a public area and a security area, both areas belonging to the same drive. Finally, the controller partitions the logical space of the memory storage device into multiple areas, which include public areas and security areas and belong to multiple drives.

13 Claims, 13 Drawing Sheets

METHOD FOR PARTITIONING MEMORY MASS STORAGE DEVICE

FIELD OF THE INVENTION

The present invention relates to mass storage device, and particularly to a method for partitioning a memory mass storage device.

BACKGROUND OF THE INVENTION

Although hard disk drives are widely used in current computer system, there are still a variety of deficiencies for the rotating-type magnetic mass storage devices, such as deficiencies of an inherent latency during accessing the hard disk drives, high power consumption, being unable to withstand the physical shock, and having a large weight for portable computer devices.

A non-volatile memory mass storage device, like a flash memory disk drive, is a nice choice for replacing a hard disk. Each memory mass storage device always comprises two portions; one is a controller part, and the other is a memory module. The semiconductor technology allows such a memory storage device to withstand many of the kinds of physical shock and reduce power consumption or weight. These flash memory storage devices are also widely used and accepted for all the current computer devices, like desktop personal computer (PC), laptop, personal digital assistant (PDA), digital camera, and soon.

Each of current mass storage devices, no matter hard disk drives or memory storage devices, is always configured as a mass storage drive by the host. This drive could be partitioned into a plurality of "logical" drives by the host. For example, the host just executes a "partition program" and then the partition information is written into the drive. When next time power-on, such a drive partitioned by the host will be recognized as multiple "logical" drives.

From the host point of view, a drive is composed of a plurality of logical blocks, and the partition information is generally located on the first block, logical block address 0(LBA 0). If the first block is defective or infected by the computer virus, all of the logical drives indicated by the partition information may not be detected by the host. It is a risk for a drive partitioned into multiple logical drives by the host.

Furthermore, because the host can freely access all the data, some important files, like system files, may be deleted by careless end users. For another aspect of this case, the right of data access is too open to meet the private or security requirements. It is another risk or inconvenience.

SUMMARY OF THE INVENTION

Accordingly, the object of the present invention is to provide a method for partitioning a memory storage device into multiple drives. Such a method is performed by the controller, instead of the host. Each of said multiple drives is an actual drive for the host, but not a logical drive. If the host executes a "partition program" to partition each drive and then a copy of partition information will be written into the first block of each drive. Thereby, it reduces the possibility of partition information defect or computer virus infection.

Moreover, a drive could be subdivided into a variety of areas; some are freely accessed by any end users and the others can be accessed just for the specific users passing the password identification. Thereby, the function of data protection or security could be implemented.

The various objects and advantages of the present invention will be more readily understood from the following detailed description when read in conjunction with the appended drawing.

DETAILED DESCRIPTION OF THE PREFERRED EMBODIMENTS

Figure 1:
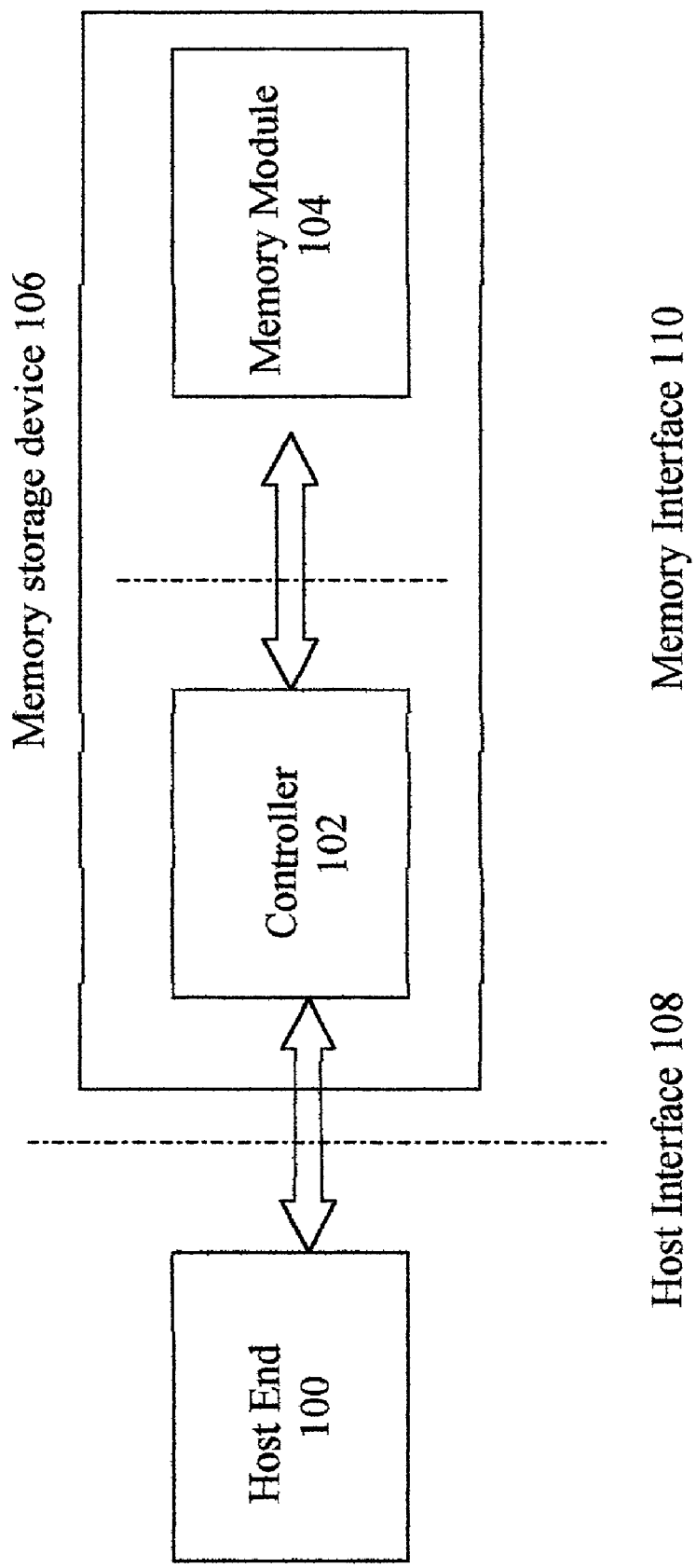
FIG. 1 shows a computer system with a memory storage device.

A memory storage device generally comprises two portions; one is the controller and the other is the memory module. As shown in FIG. 1, the architecture of a memory storage device 106 consists of a controller 102, and a memory module 104. The controller 102 is coupled to host end 100 by host interface 108 and coupled to the memory module 104 by memory interface 110. The task of the controller 102 is to communicate with host end 100 and manage the memory module 104. The memory module 104 includes at least one memory chip, like flash memory, programmable read only memory (PROM), read only memory (ROM), or electrically erasable programmable read only memory (EEPROM) for storing data therein.

Logical to Physical Mapping

Figure 2:
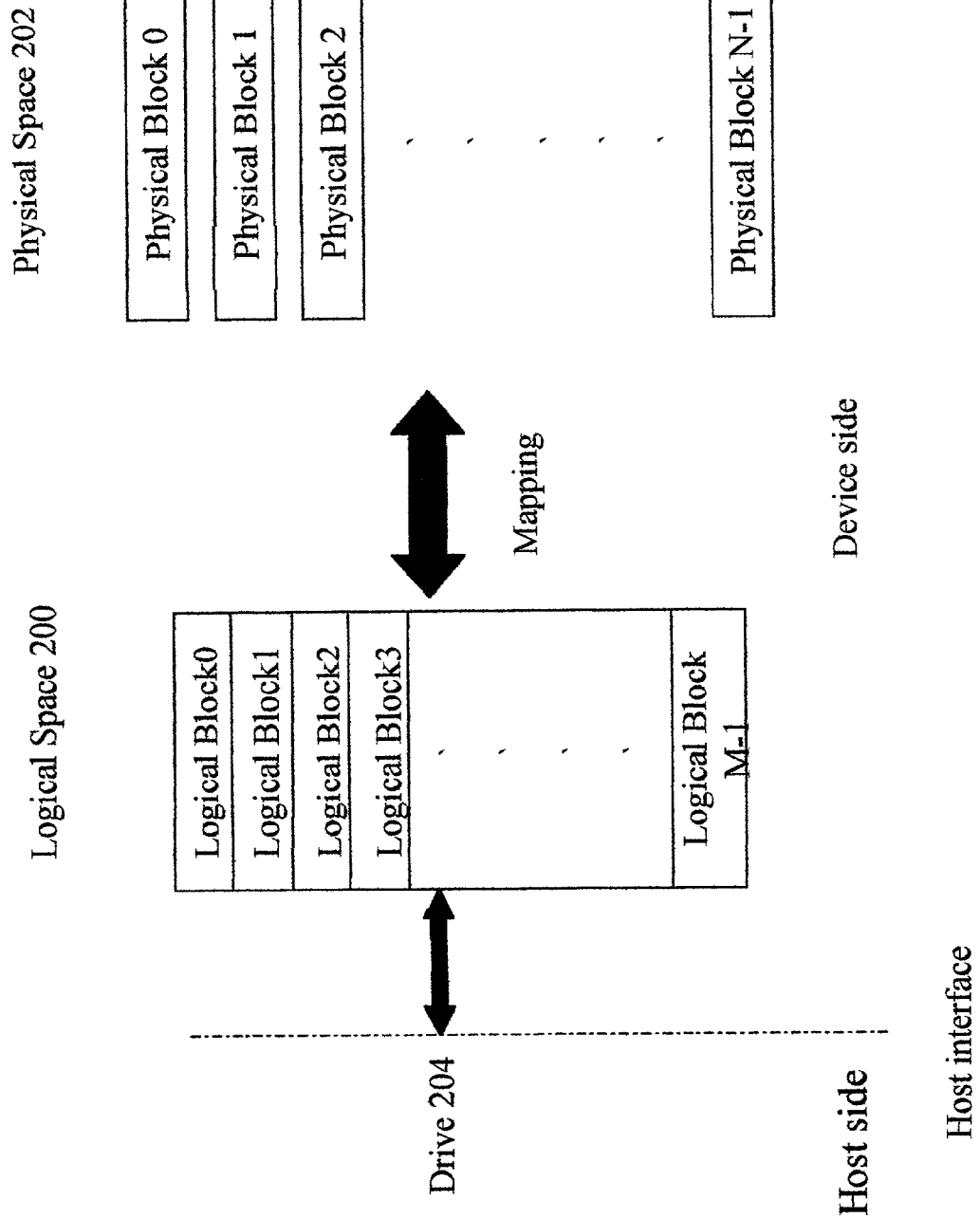
FIG. 2 shows a conventional method for the usage of a logical space and configuration of a memory storage device.

As shown in FIG. 2, a memory storage device is configured as a drive 204 by the host. From the host point of view, such a drive 204 includes a plurality of logical blocks, each of which can be addressed by the host; namely, the host can access all the logical space 200 including a logical block 0, logical block 1, and logical block M-1.

A memory chip generally is divided into a plurality of storage units, like blocks. As FIG. 2, the physical space 202 of the memory module includes physical block 0, physical block 1, . . . , and physical block N-1. The logical space 200 used by the host is always less than the physical space 202, because some of the physical blocks may be defective or used by the controller for managing the memory module. One task of the controller is to create the logical space 200 for host access. Indeed, the host can not directly address the physical space 202 so that the controller must maintain the mapping relations between the logical blocks and the physical blocks. Such a mapping information is always called as a mapping table and can be stored in the specific physical blocks or loaded into the SRAM within the controller. If a host asks for reading a particular logical block, the controller will look up the mapping table for identifying which physical block to be accessed, transfer data from the physical block to itself, and then transfer data from itself to the host.

Partition performed by the host

Figure 3:
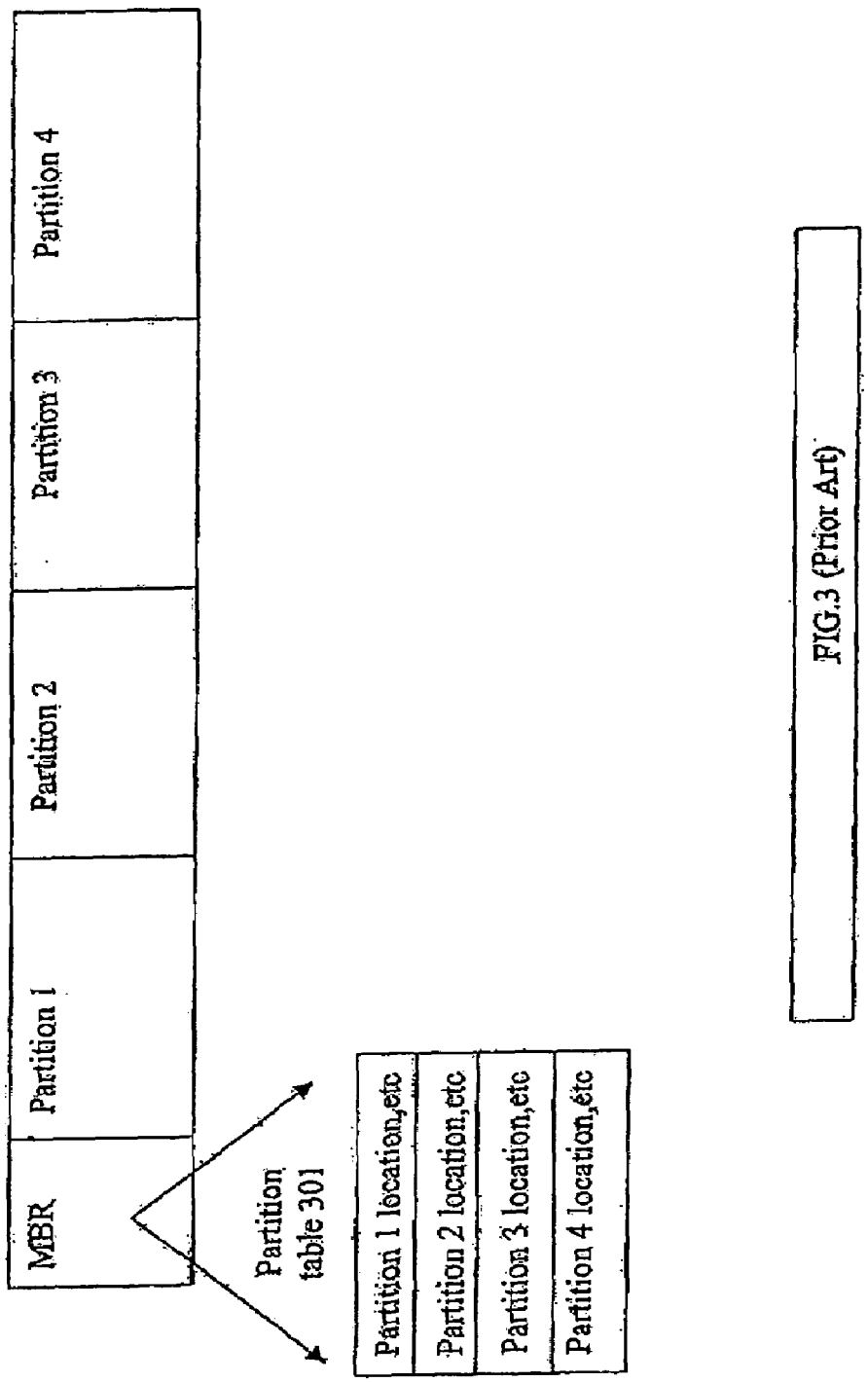
FIG. 3 shows a conventional structure of disk partition performed by the host.

In the prior art as shown in FIG. 2, a controller generally allocates all the logical space 200 to the drive 204 so that the size of the drive 204 used by the host is equal to that of the logical space 200. In order to managing a variety of files, the host would partition the drive 204 into multiple logical drives before using these logical drives for storing data. As FIG. 3, a storage device, like a hard disk or a memory storage device, is partitioned into 4 logical drives by the host. The partition structure is compatible with DOS® and the partition information, called partition table 301, is stored at the beginning area of the logical space, logical block address 0(LBA0). The beginning area is called master boot record(MBR)also, in addition to partition table 301, some information for host boosting was stored therein.

The contents of partition table 301 point out where each partition is located. A partition is as a logical drive so that the host can fully use 4 logical drives after partitioning the logical space provided by the controller. This partition way performed by the host results in a variety of deficiencies. For example, if the partition table 301 of MBR is defective or infected by the computer virus, all the logical drives may not be detected anymore. Besides, the partition structure performed by the host is a open standard, so that any user using the host can easily free access all the files in any logical drives. Some important files, like system files, may be deleted by careless end users; some private, confidential documents, like your financial information, may be found by any intended users. There are no security or data protection functions for such a partition way performed by the host.

Partition performed by the controller

Figure 4:
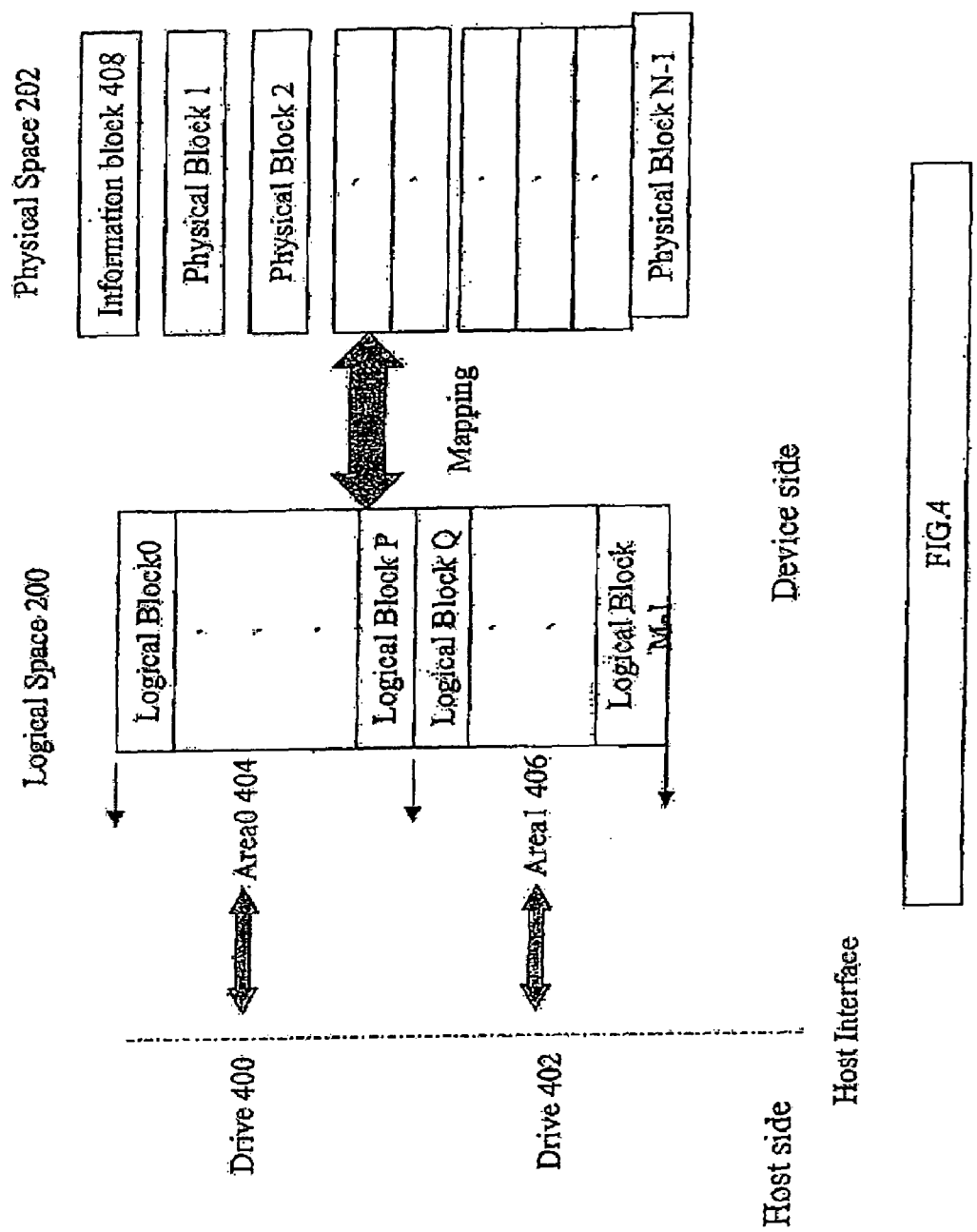
FIG. 4 shows that the controller partitions a logical space of a memory storage device into two drives.
Figure 5:
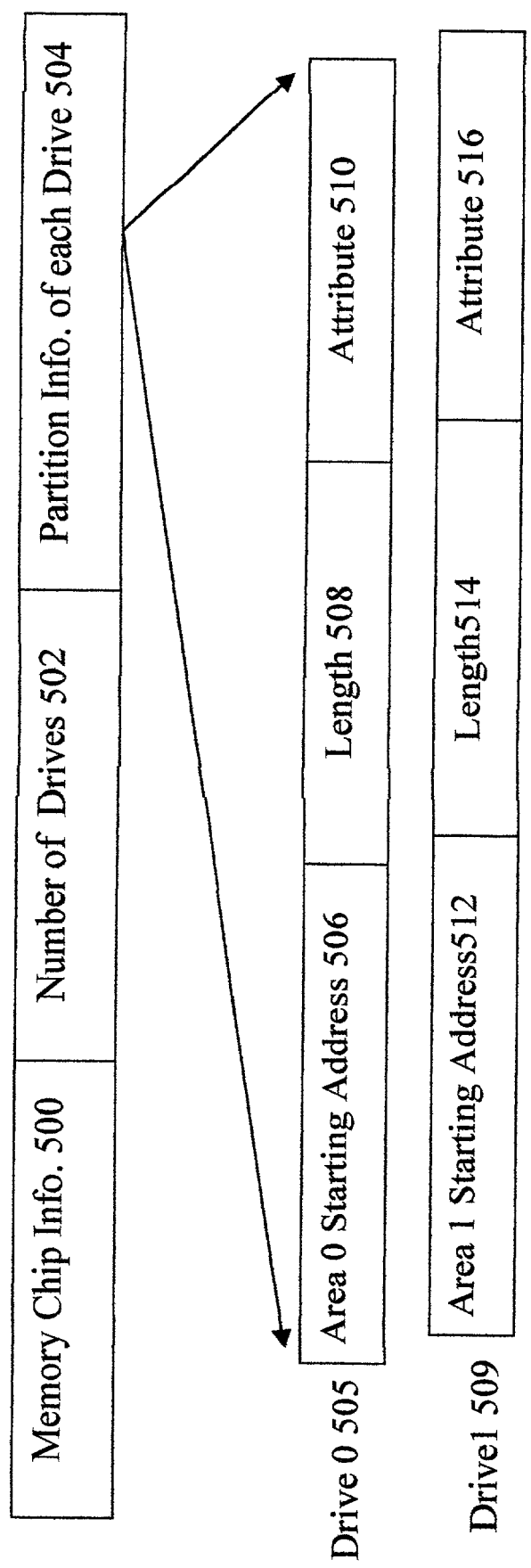
FIG. 5 shows the data structure of the information block according to the present invention.

In our present invention, the controller within the memory storage device has partitioned the logical space 200 into multiple areas before the host uses the memory storage device, as shown in FIG. 4. Each area is allocated to each drive for use with the host. As FIG. 4, the logical space 200 is partitioned into two areas by the controller, the area0 404 allocated to drive 400 and the area1 406 allocated to drive 402. The partition information is stored in a particular physical block, called information block 408. As FIG. 5, it shows the data structure of the information block according to the present invention. The memory chip information 500 records how many memory chips there are within the memory storage device and their sizes. The number of drives 502 is the total drives that can be used by the host. In this case, this value is 2. The partition information of each drive 504 includes drive0 505 and drive1 509. With reference to FIG. 4 also, the drive 0 505 in FIG. 5 includes area0 starting address 506, length 508, and attribute 510. The starting address 506 and the length 508 determine the range of area0 404. The attribute 510 specifies the area0 404 access mode for the host, like read-only or full access mode. The drive1 509 includes area1 starting address 512, length 514, and attribute 516. The function is like the foregoing descriptions. The starting address 512 and the length 514 determine the range of area1 406. The attribute 516 specifies the area1 406 access mode for the host, like read-only or full access mode.

Once the memory storage device is plugged into the slot attached in the host, the controller will read the information block into the SRAM within the controller after initial power-on. In order to correctly configure this memory storage device, the host will ask for some basic information about the memory storage device, like the number of drives for the memory storage device and the size of each drive. According the information block data loaded into the SRAM, the controller will respond to host requests. As a result, the area0 404 is allocated to the drive 400 configured by the host and the area1 406 is allocated to the drive 402 configured by the host. Comparing with the prior art in FIG. 2, in the present invention, the controller partitions the total logical space of the memory storage device into multiple areas, which belong to multiple drives respectively. These multiple drives are all independent drives, instead of the logical drives created by the host. When the host executes a "partition program" to partition each independent drive for creating at least one logical drive, and then a copy of partition information will be written into the first block of each independent drive; thus, each independent drive has its own partition information. Thereby, it reduces the possibility of partition information defect or computer virus infection.

A security drive

Using the same concept of the logical space partition performed by the controller, the memory storage device can increase the security function. In another preferred embodiment of the invention as FIG. 6, the controller partitions the logical space 200 into two areas, area0 602 and area1 604. To be easily understood, the area0 602 is called a public area which can be free accessed by the host, or any end users; the area1 604 is called a security area which can be accessed by the host or the specific end user only after passing the identification of the password for controlling the access right of the area1 604. These two areas belong to the same drive 600 used by the host, but the host only can access each of them once.

Figure 6:
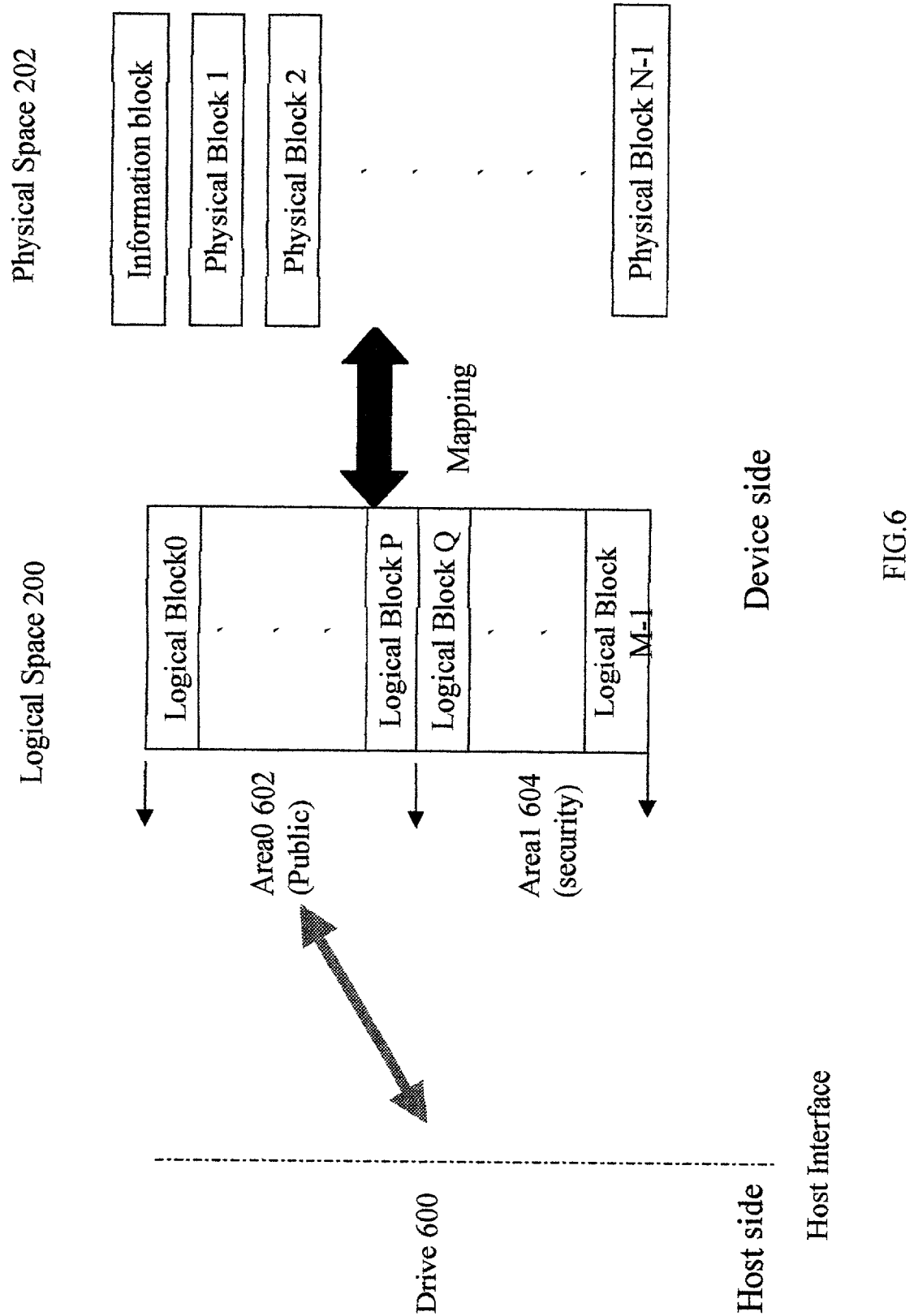
FIG. 6 shows that the controller partitions a logical space of a mass storage device into a public area and a security area, both areas belonging to the same drive.
Figure 8:
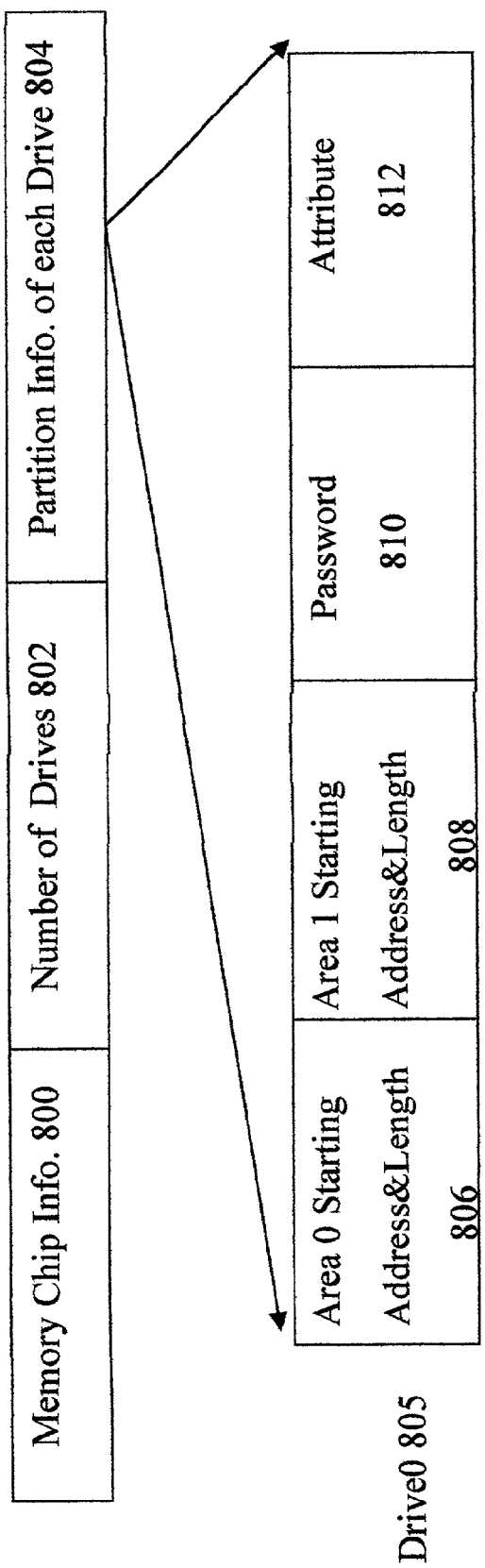
FIG. 8 shows the data structure of information block according to the present invention.

As FIG. 8, it is the data structure of the information block for such a partition. The memory chip information 800 records how many memory chips there are within the memory storage device and their sizes. The number of drives 802 is the total drives that can be used by the host. In this case, this value is 1. The partition information of each drive 804 includes only drive0. With reference to FIG. 6 also, the drive 0 805 in FIG. 8 includes public area0 starting address & length 806, security area1 starting address & length 808, password 810, and attribute 812. The 806 and 808 determine the ranges of public area0 602 and security area1 604. The password 810 is for controlling the access right of the security area1 604. The attribute 812 specifies each area access mode for the host, like read-only or full access mode.

Once the memory storage device is plugged into the slot attached in the host, the controller will read the information block into the SRAM within the controller after initial power-on. According the information block data loaded into the SRAM, the controller will respond to host requests for configuring the memory storage device. In this case, the number of drives is 1 and the size of the drive 600 is as that of the public area0 602. Accordingly, the public area0 602 of the drive 600 can be free accessed by the host, but the security area1 604 can not be seen by the host or any end user after the initial configuration.

A security management program is used for managing the security functions. If a specific end user wants to access the security area1 604 of the drive 600, the said security management software is executed first; then, the specific end user enters a password to the executed program. Finally, this security management program enables the host to send a password to the memory storage device for accessing the security area1 604. The said security management program can be stored in any public area of the memory storage device and becomes a portable tool for using the security function.

Figure 7:
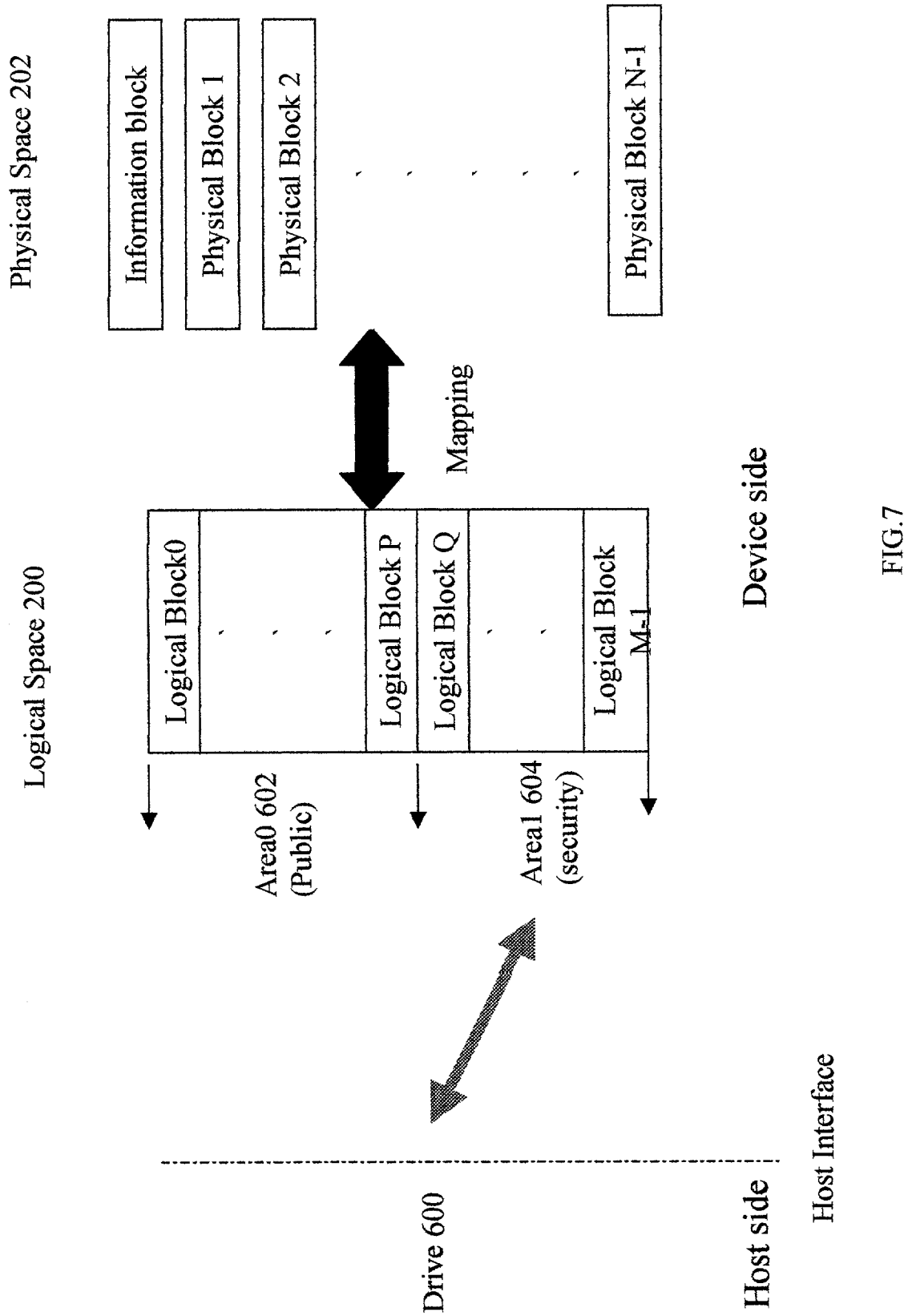
FIG. 7 shows that the security area will be accessed by the host after passing the password identification.

After received the password from the host, the controller compares the host input password with the password 810 loaded into the SRAM of the controller. As shown in FIG. 7, if the host passes the password identification, the security area1 604 of the drive 600 can be accessed by the host or the specific end user. For those end users using this security function, some important files could be stored in the security area1 604 to prevent a careless or an intended use from deleting or copying these private data.

Multiple drives with the security function.

Figure 9:
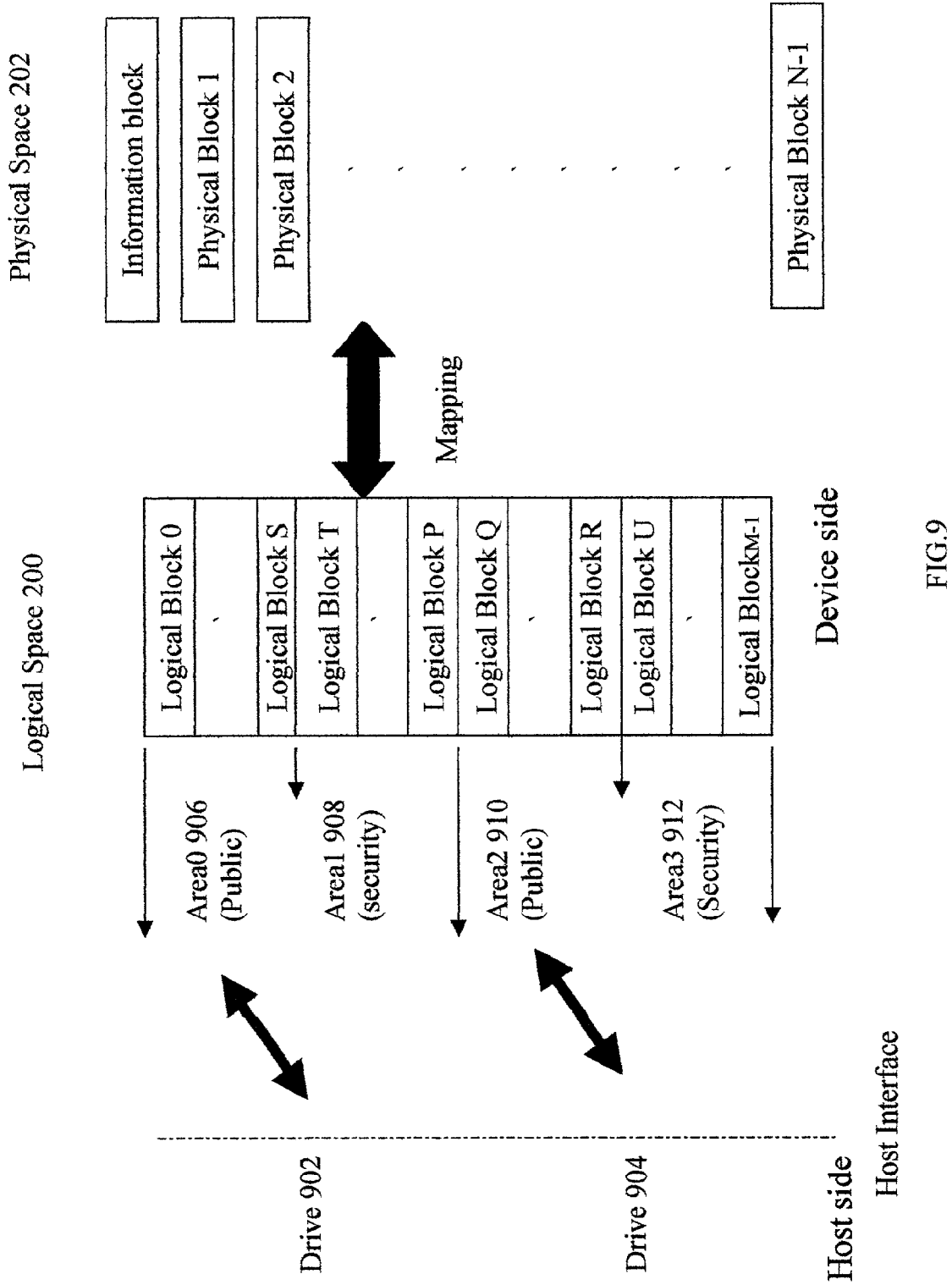
FIG. 9 shows that the controller partitions a logical space of a memory storage device into two drives, each of which includes a public area and a security area, in which the public area of each drive can be freely accessed by the host.
Figure 11:
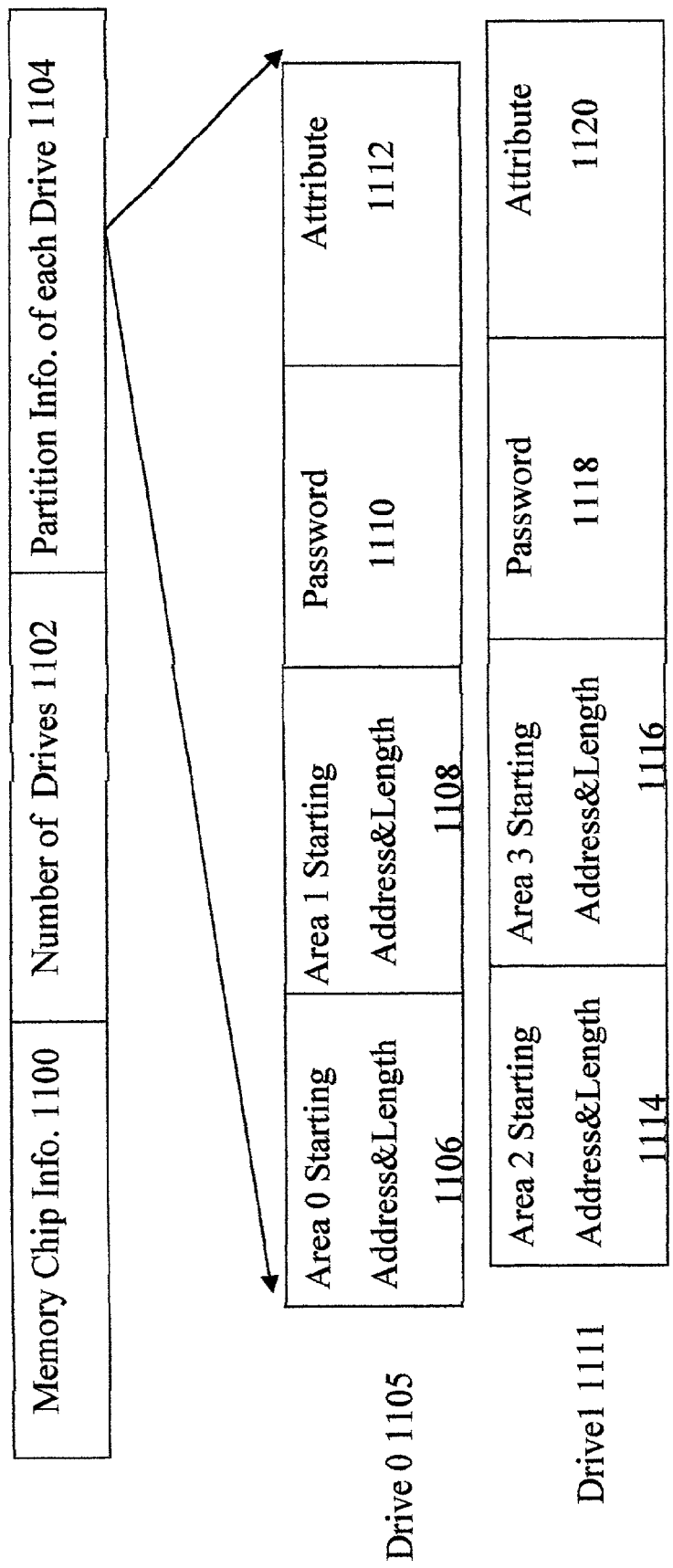
FIG. 11 shows the data structure of the information block according to the present invention.

In another preferred embodiment of the invention, the combinations of previous two skills make it possible to partition a memory storage device into multiple drives, each with the security function. As FIG. 9, at first, the controller partitions the logical space 200 into two drives and then partitioned each drive into a public area and a security area. FIG. 11 shows the data structure of information block for such a partition. The memory chip information 1100 records how many memory chips there are within the memory storage device and their sizes. The number of drives 1102 is the total drives that can be used by the host. In this case, this value is 2. The partition information of each drive 1104 includes drive0 1105 and drive1 1111. The drive0 1105 includes public area0 starting address & length 1106, security area1 starting address & length 1108, password 1110, and attribute 1112. The 1106 and 1108 respectively determine the ranges of public area0 906 and security area1 908 within drive 902 in FIG. 9. The password 1110 is for controlling the access right of the security area1 908. The attribute 812 specifies the each area access mode for the host, like read-only or full access mode. The drive1 1111 includes public area2 starting address & length 1114, security area3 starting address & length 1116, password 1118, and attribute 1120. The 1114 and 1116 respectively determine the ranges of public area2 910 and security area3 912 within drive 904 in FIG. 9. The password 1118 is for controlling the access right of the security area3 912. The attribute 1120 specifies the each area access mode for the host, like read-only or full access mode.

Once the memory storage device is plugged into the slot attached in the host, the controller will read the information block into the static random access memory (SRAM) within the controller after initial power-on. According to the information block data loaded into the SRAM, the controller will respond to host requests for configuring the memory storage device. In this case, the number of drives is 2, the size of the drive 902 is the same as that of the public area0 906, and the size of the drive 904 is the same as that of the public area2 910. Accordingly, the public area0 906 of the drive 902 and the public area2 910 of the drive 904 can be freely accessed by the host, but the security area1 908 of the drive 902 and the security area3 912 of the drive 904 can not be seen by the host or any end user after the initial configuration.

Figure 10:
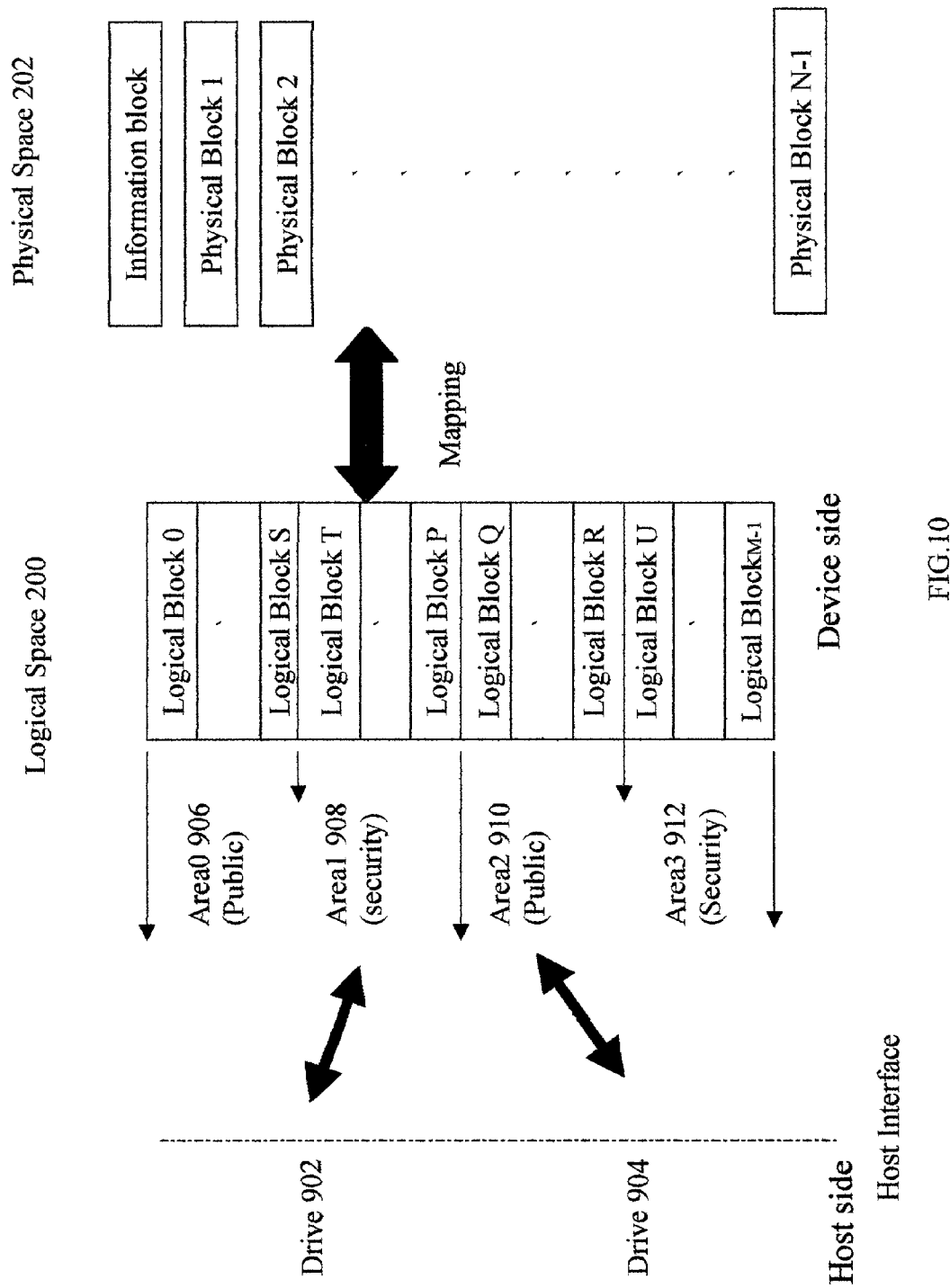
FIG. 10 shows that the security area of first drive will be accessed by the host after passing the password identification.

If a specific end user wants to access the security area1 908 of the drive 902, the security management program is executed first, then, the specific end user enters a password to the executed program. Finally, this security management program enables the host to send a password to the memory storage device for accessing the security area1 908. After receiving the password from the host, the controller compares the host input password with the password 1110 loaded into the SRAM of the controller. As shown in FIG. 10, if the host passes the password identification, the security area1 908 of the drive 902 can be accessed by the host or the specific end user. Such a partition not only reduces the possibility of MBR defect or computer virus infection, but also realizes the security function for a memory mass storage device.

However, in the present invention, the sizes of the security area or the public area are adjustable. As required, the size of the public area can be set at zero and then only the security area exists for a particular drive.

Removable memory module

In our invention, the memory storage device partitioned into multiple security drives, can be substantially divided into two portions; one is called a adapter with a controller inside and the other is a removable memory module including a plurality of memory chips. Such a architecture is beneficial to the end users. If a end user wants to upgrade the capacity of the whole memory storage device, just removes the original memory module and then inserts a new, large-size memory module. Certainly, the information block data must be stored in the new memory module before insertion.

Figure 12:
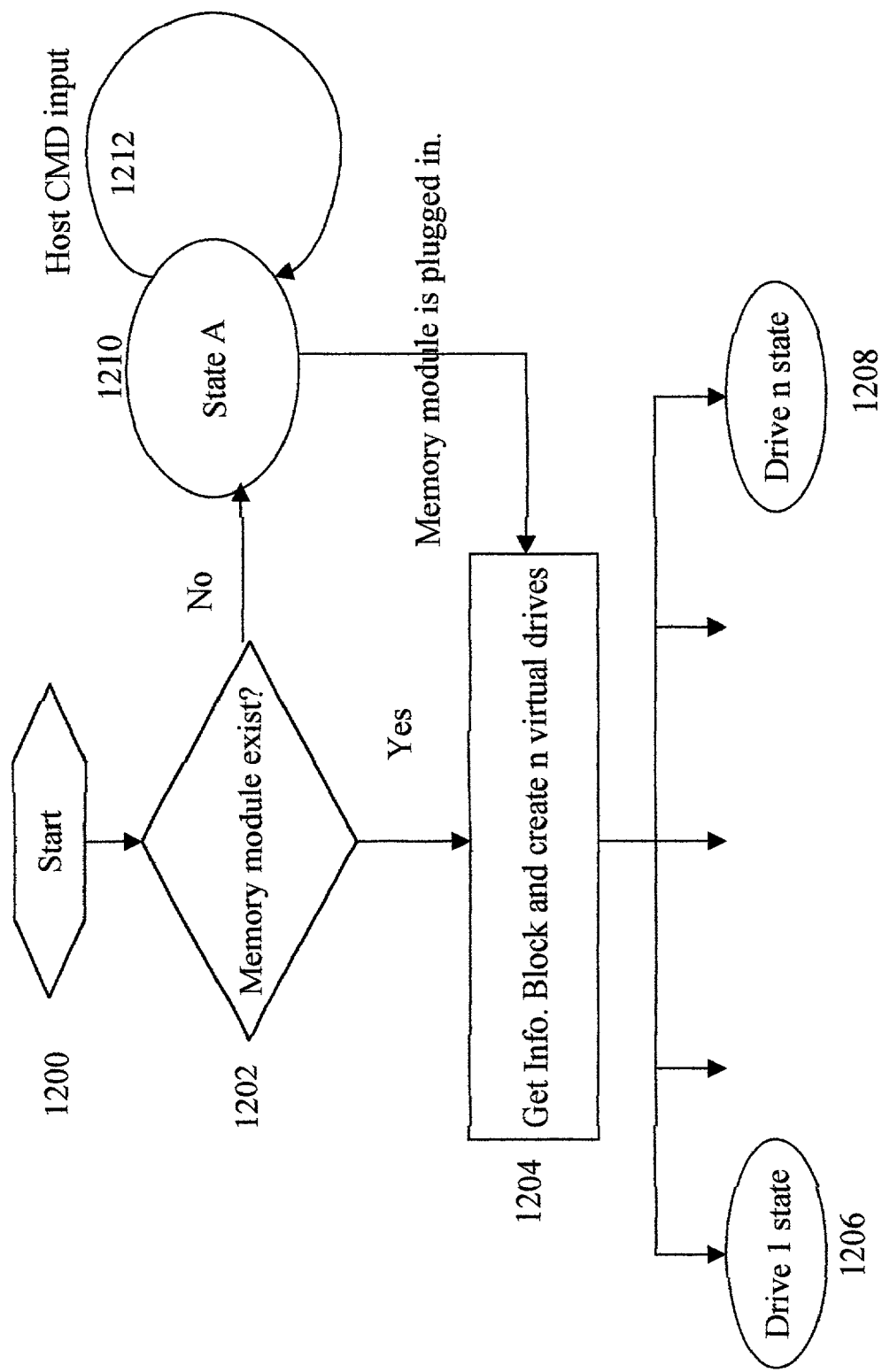
FIG. 12 shows the state flow for a memory storage device with or without the memory module.
Figure 13:
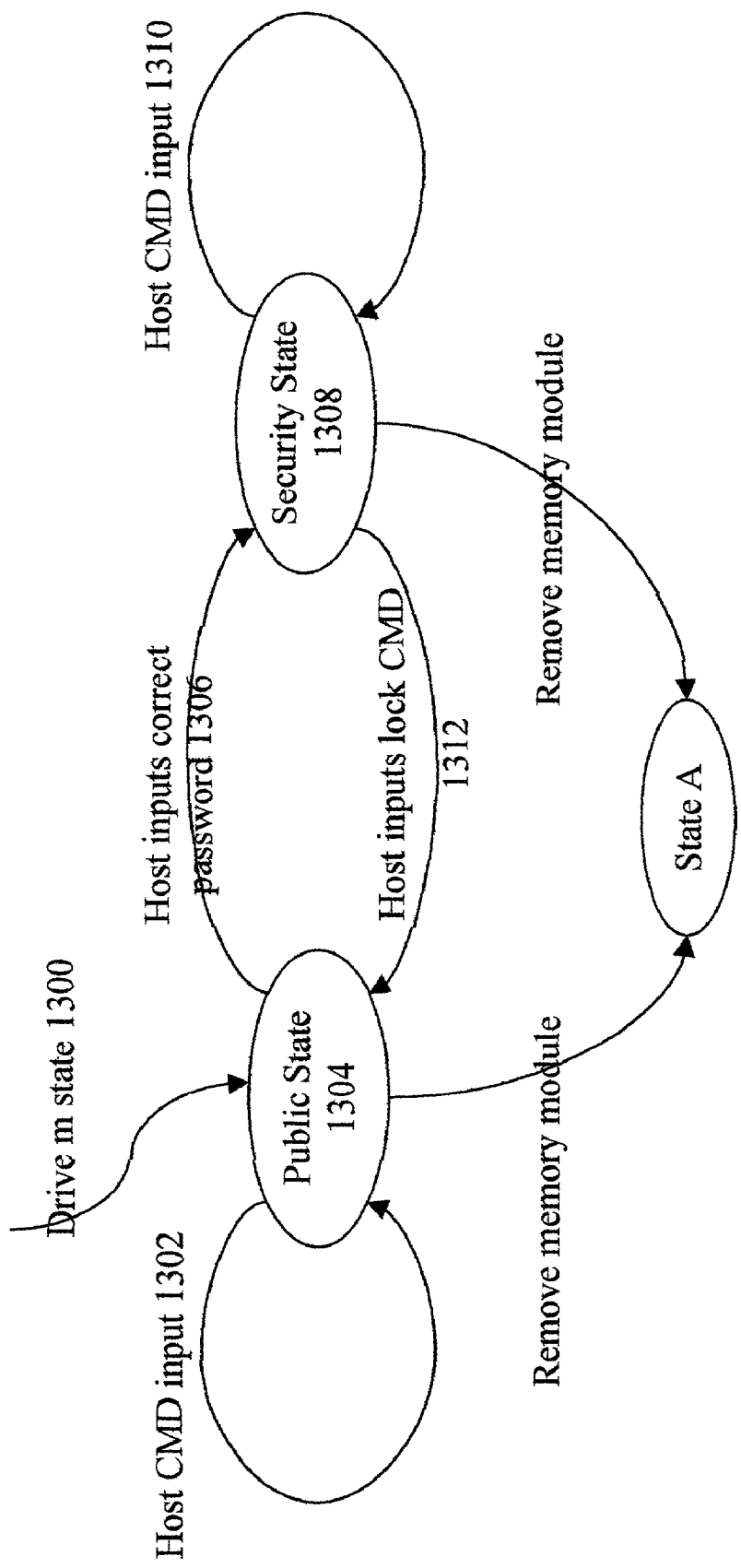
FIG. 13 shows the state change for switching the public area and the security area.

FIG. 12 shows the controller state flow for a memory storage device with or without the memory module. In step 1202, the controller checks whether any memory module exists. If it is yes, the process goes to step 1024 to read the information block into the SRAM of the controller and then determines each drive state, like drive 1 state 1206, . . . , and drive n state 1208. FIG. 13 is the continued flowchart of FIG. 12 and describes the operations for switching the public area and the security area. The drive m state 1300 represents any drive state. The default state for each drive is in public state 1304 that means the public area can be free accessed by the host command input 1302 after initial power-on. If the host inputs a password for accessing the security area of a particular drive m, the public state 1304 of drive m will be transferred into the security state 1308 after the host passes the password identification. When drive m is in the security state, it means the security area can be accessed by host command input 1310. Moreover, if the host inputs a lock command 1312, the security state will return to the public state.

If there is no memory module plugged in, the controller will go into the state A 1210. During the state A 1210, the controller always responds a no media message when the host asks for data access by the host command input 1212. Once the memory module is plugged into the adapter, state A 1210 will go into the step 1204. Accordingly, the controller will read the information block and realize the security functions as stated above.

Other than flash memories, above said embodiment is suitable for a variety of memories, such as flash memories, ROMs, PROMs, EPROMs, EEPROMs, and hard disks without departure from the scope and spirit of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for accessing a memory storage device under the direction of a controller within said memory storage device, comprising:

providing a removable memory storage device as said memory storage device, which includes a memory module having at least one memory chip;

partitioning a logical space into one security area and at least one public area;

storing partition information of said logical space into an information block within said memory module, said partition information including a password for accessing said security area;

reading said information block within said memory module into said controller, wherein said password within said information block is loaded into said controller;

executing a security management program in said host side for asking an end user to enter a password; and responding to a host input password for accessing said security area, comparing said host input password with said password loaded into said controller, wherein said public is accessed by said host after initial power-on while said security area is unable to be accessed by said host after initial power-on; said security area of said particular drive being able to be accessed by said host after passing the password identification.

2. The method of claim 1, wherein said information block further comprised of the memory chip information, the number of drives, and the partition information of each drive.

3. The method of claim 1, wherein said partition information of each drive is comprised of said security area starting address, length, and the attribute of the partitioned area.

4. The method of claim 1, wherein said memory module is also removable from said controller in said memory storage device and is selected from one of a group containing ROMs, PROMs, EEPROMs, flash memory and hard disks.

5. The method of claim 1, wherein the sizes of said security area or said public area are adjustable.

6. The method of claim 1, wherein said security management program is stored in said public area.

7. A method for accessing a memory storage device partitioned under the direction of a controller within said memory storage device, comprising:

providing a removable memory storage device as the memory storage device, which includes a memory module having at least one memory chip;

partitioning a logical space into at least one security area and at least one public area;

storing partition information of said logical space into an information block within said memory module, said partition information including a password for accessing said security area;

reading said information block within said memory module into said controller after initial power-on, wherein said password within said information block is loaded into said controller;

storing partition information regarding said public area into said information block within said memory module;

reading said information block within said memory module into said controller after initial power-on;

responding to the host input for reading a basic information regarding said memory storage device according to the contents of said information block loaded into said controller, wherein said public area is first accessed by said host after initial power-on;

responding to a host input password for accessing said security area, comparing said host input password with said password loaded into said controller, wherein said security area is unable to be accessed by said host after initial power-on; said security area is accessed by said host after passing the password identification.

8. The method of claim 7, wherein said security management program is stored in said public area.

9. The method of claim 7, wherein the method is applied to a drive having two sub-drives, each of the sub-drives has the public area and the security area.

10. A method for accessing a memory storage device partitioned under the direction of a controller within the removable memory storage device, the method comprising:

providing a removable memory storage device as the memory storage device, wherein the removable memory storage device including a memory module having at least one memory chip;

partitioning a logical space of the removable memory storage device into a public area and a security area by the controller, said security area being allocated to a drive for use with a host;

loading a partition information with respect to the security area into the controller, wherein an access password to the security area is also loaded into the controller;

executing a security management program for asking an end user to enter a password; and when the host wants to access the security area at the first time, comparing the entered password with the access password stored in the controller to check whether or not a match occurs, and the host configures the security area based on a partition information made by the controller, wherein the security area is accessed by the host only when the match occurs.

11. The method of claim 10, wherein said security management program is stored in said public area.

12. The method of claim 10, wherein the method is applied to a drive having two sub-drives, each of the sub-drives has the public area and the security area.

13. A method for partitioning a memory storage device under the direction of a controller within said memory storage device, the method comprising:

providing a removable memory storage device as the memory storage device, wherein the removable memory storage device includes a memory module having at least one memory chip, partitioning a logical space into at least one security area, said security area being allocated to a particular drive for use with a host;

storing partition information of said logical space into an information block within said memory module, said partition information including a password for accessing said security area;

reading said information block within said memory module into said controller after initial power-on, wherein said password within said information block is loaded into said controller;

responding to a host input password for accessing said security area, comparing said host input password with said password loaded into said controller, wherein said security area is unable to be accessed by said host after initial power-on; said security area of said particular drive being able to be accessed by said host after passing the password identification;

partitioning said logical space into at least one public area, said public area being allocated to said particular drive for use with said host;

storing partition information regarding said public area of said particular drive into said information block within said memory module;

reading said information block within said memory module into said controller after initial power-on; and responding to the host input for reading a basic information regarding said memory storage device according to the contents of said information block loaded into said controller, wherein said public area of said particular drive is able to be accessed by said host after initial power-on.

* * * * *